United States Patent
Hashimoto

(10) Patent No.: US 9,835,117 B2
(45) Date of Patent: Dec. 5, 2017

(54) FUEL REFORMING SYSTEM

(71) Applicant: HONDA MOTOR CO., LTD., Tokyo (JP)

(72) Inventor: Kohtaro Hashimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/035,390

(22) PCT Filed: Nov. 19, 2014

(86) PCT No.: PCT/JP2014/080667
§ 371 (c)(1),
(2) Date: May 9, 2016

(87) PCT Pub. No.: WO2015/076305
PCT Pub. Date: May 28, 2015

(65) Prior Publication Data
US 2016/0290289 A1 Oct. 6, 2016

(30) Foreign Application Priority Data

Nov. 20, 2013 (JP) .................................. 2013-240400

(51) Int. Cl.
*F02M 27/02* (2006.01)
*B01J 8/02* (2006.01)
(Continued)

(52) U.S. Cl.
CPC .............. *F02M 27/02* (2013.01); *B01J 8/001* (2013.01); *B01J 8/02* (2013.01); *B01J 31/0247* (2013.01);
(Continued)

(58) Field of Classification Search
CPC .. F02M 27/02; B01J 8/001; B01J 8/02; C10L 1/182; C10L 10/10
(Continued)

(56) References Cited

U.S. PATENT DOCUMENTS 5,981,420 A 11/1999 Nakano et al.
2006/0122283 A1* 6/2006 Pawlak ................ B01J 19/2415
518/702

(Continued)

FOREIGN PATENT DOCUMENTS

| JP | 10-286467 A | 10/1998 |
|---|---|---|
| JP | 2007-247515 A | 9/2007 |
| JP | 2008-240624 A | 10/2008 |

OTHER PUBLICATIONS

Office Action dated Jan. 12, 2016, issued in counterpart Japanese Application No. 2015-543178 (2 pages).
(Continued)

*Primary Examiner* — Walter D Griffin
*Assistant Examiner* — Huy-Tram Nguyen
(74) *Attorney, Agent, or Firm* — Westerman, Hattori, Daniels & Adrian, LLP

(57) ABSTRACT

Provided is a fuel reforming system that can convert gasoline into alcohol in a vehicle. Provided is a fuel reforming system (1) equipped with a reformer (15) having a reforming catalyst (152) that uses air to reform gasoline to produce alcohol, a mixer (14) which mixes gasoline and air and supplies the mixture to the reformer (15), and a condenser (16) which separates the gas produced in the reformer (15) into a gas phase and a condensed phase of which reformed fuel is the primary constituent; wherein the fuel reforming system (1) is characterized in that the reforming catalyst (152) is configured including a main catalyst for extracting hydrogen atoms from the hydrocarbons in the gasoline to
(Continued)

produce alkyl radicals, and a catalytic promoter for reducing alkyl hydroperoxides produced from the alkyl radicals to produce alcohol.

9 Claims, 1 Drawing Sheet

(51) Int. Cl.
*C10L 1/06* (2006.01)
*B01J 31/02* (2006.01)
*B01J 31/22* (2006.01)
*B01J 8/00* (2006.01)
*C10L 1/182* (2006.01)
*C10L 10/10* (2006.01)

(52) U.S. Cl.
CPC ............ *B01J 31/2239* (2013.01); *C10L 1/06* (2013.01); *C10L 1/182* (2013.01); *C10L 10/10* (2013.01); *B01J 2208/00548* (2013.01); *B01J 2208/02* (2013.01); *B01J 2231/70* (2013.01); *B01J 2531/72* (2013.01); *B01J 2531/845* (2013.01); *C10L 2200/0423* (2013.01); *C10L 2270/023* (2013.01); *C10L 2290/06* (2013.01); *C10L 2290/24* (2013.01); *C10L 2290/58* (2013.01)

(58) Field of Classification Search
USPC .......................................................... 422/187
See application file for complete search history.

(56) References Cited

U.S. PATENT DOCUMENTS

2007/0215098 A1      9/2007  Hashimoto et al.
2009/0253007 A1*   10/2009  Mergler ............ H01M 8/04014
                                                                                429/442
2010/0330446 A1*   12/2010  Lucka ..................... C01B 3/382
                                                                                429/425

OTHER PUBLICATIONS

Sakaguchi et al., "An Efficient Aerobic Oxidation of Isobutane to t-Butyl Alcohol by N-Hydroxyphthalimide Combined with Co(H) Spicies", Bull. Chem. Jpn., The Chemical Society of Japan, vol. 71, 1998, pp. 1237-1240.
International Search Report dated Feb. 24, 2015, issued in counterpart international Application No. PCT/JP2014/080667 (1 page).

* cited by examiner

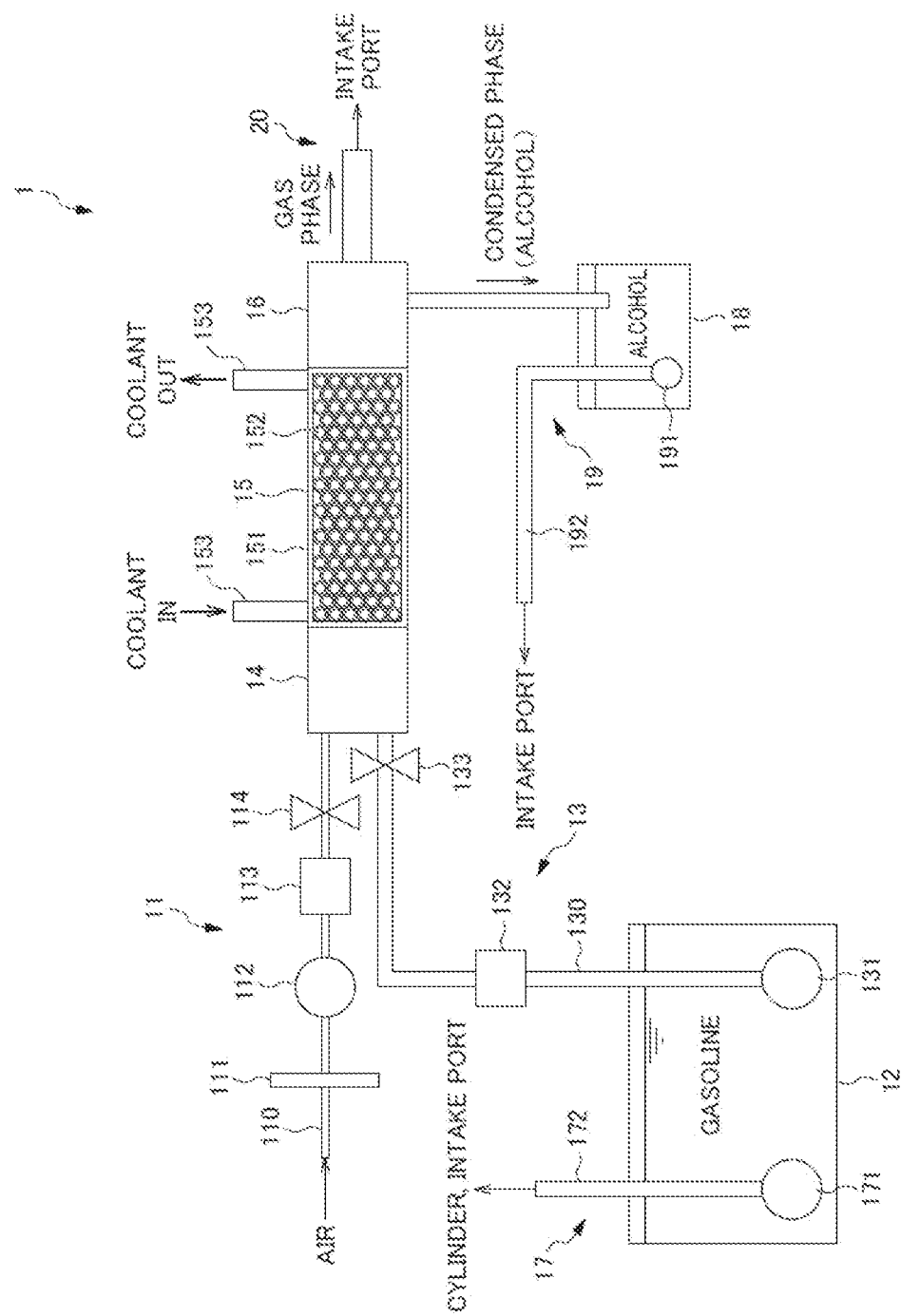

FUEL REFORMING SYSTEM

TECHNICAL FIELD

The present invention relates to a fuel reforming system. In detail, it relates to a fuel reforming system that can raise the octane rating of fuel by reforming fuel with hydrocarbons as a primary constituent.

BACKGROUND ART

With a gasoline engine causing a mixture of fuel and air that was mixed in advance to combust by the ignition spark from a spark plug, knocking has been known to occur by the uncombusted mixture (end gas) isolated from the spark plug auto igniting. Knocking tends to occur when raising the compression ratios of engines; therefore, with the high-compression engines of recent years, the suppression of knocking has been strongly demanded.

A method which retards the ignition timing has been given as a method for suppressing knocking. However, when retarding the ignition timing, the fuel efficiency of the engine declines. For this reason, the development of technology whereby high fuel efficiency is obtained while suppressing knocking is demanded also for high-compression engines.

However, since knocking can be suppressed by raising the octane rating of fuel, alcohol-containing fuel produced by mixing alcohols such as ethanol into gasoline in advance has been widely used as fuel with high octane rating in some regions. In addition, accompanying the spread of such alcohol-containing fuels, the development of technology for separating the alcohol-containing fuels refueled from outside into fuel of high gasoline concentration and fuel of high alcohol concentration onboard the vehicle is being advanced. This is because, since there are various points of difference in the fuel properties such as octane rating and heating value between gasoline and alcohol, for example, it is more preferable to separate onboard the vehicle and use gasoline and alcohol differently depending on the application, than using alcohol-containing fuel that was filled from outside as is. However, separation that depends on the demand of the engine is not easy.

On the other hand, a synthesis method has been proposed that causes hydrocarbons to convert to alcohols using a carbon-radical generating catalyst such as N-hydroxyphthalimide (NHPI) (refer to Non-Patent Document 1, for example). If it were possible to use this synthesis method onboard the vehicle, it is considered to be possible to convert hydrocarbons contained in gasoline into alcohols of high octane rating according to the demand of the engine, and possible to supply the alcohols of high octane rating to the engine.

Non-Patent Document 1: S. Sakaguchi, S. Kato, T. Iwahama, Y. Ishii; Bull. Chem. Soc. Jpn., 71 (1998) pp. 1237-1240

DISCLOSURE OF THE INVENTION

Problems to be Solved by the Invention

However, the current situation is that consideration has not yet been given to converting gasoline into alcohol of high octane rating using the aforementioned carbon-radical generating catalyst. Therefore, if technology for converting gasoline into alcohol onboard the vehicle can be established, it will be very advantageous because it will be possible to supply alcohol of high octane rating according to the demands of the engine, and thus it becomes possible to obtain high fuel efficiency while suppressing knocking.

The present invention has been made taking account of the above, and an object thereof is to provide a fuel reforming system that can convert gasoline with hydrocarbons as a main constituent into alcohol onboard a vehicle.

Means for Solving the Problems

According to a first aspect of the present invention, a fuel reforming system (e.g., the fuel reforming system 1 described later) includes: a reformer (e.g., the reformer 15 described later) that includes a reforming catalyst (e.g., the reforming catalyst 152 described later) which reforms fuel with hydrocarbons as a main constituent (e.g., the gasoline described later) using air to produce alcohols; a mixer (e.g., the mixer 14 described later) that is provided upstream of the reformer, and mixes the fuel and air and supplies to the reformer; and a condenser (e.g., the condenser 16 described later) that is provided downstream of the reformer, and separates product gas generated by the reformer into a condensed phase with reformed fuel as a main constituent and a gas phase. The reforming catalyst is configured to include a primary catalyst which abstracts hydrogen atoms from the hydrocarbons in the fuel to produce alkyl radicals, and an auxiliary catalyst which reduces alkyl hydroperoxides produced from the alkyl radicals to produce alcohols.

The fuel reforming system according to the first aspect of the present invention is provided with, in order from an upstream side, a mixer that mixes air and fuel with hydrocarbons as a main constituent and supplies to a reformer, the reformer that reforms the fuel using air to produce alcohols, and a condenser that separates the product gas generated by the reformer into a condensed phase and gas phase. In addition, the reformer is provided with a reforming catalyst that is configured to include a primary catalyst which abstracts hydrogen atoms from the hydrocarbons in fuel to produce alkyl radicals, and an auxiliary catalyst which reduces alkyl hydroperoxides produced from the alkyl radicals to produce alcohols.

According to the first aspect of the present invention, since fuel with hydrocarbons as the main constituent such as gasoline can be reformed and converted into alcohols, it is possible to raise the octane rating of the fuel. In addition, equipping to a vehicle is possible due to the configuration of the system being simple by using air as the oxidizer, whereby fuel of higher octane rating can be supplied to the engine according to the demand of the engine in the vehicle. Therefore, according to the first aspect of the present invention, even with engines of raised compression ratio, high fuel efficiency is obtained while suppressing knocking.

According to a second aspect of the present invention, it is preferable for the primary catalyst to be an N-hydroxyimide group-containing compound.

In the second aspect of the present invention, an N-hydroxyimide group-containing compound is used as the primary catalyst. Since it is thereby possible to more reliably abstract hydrogen atoms from the hydrocarbons in the fuel, it is possible to more reliably convert hydrocarbons into alcohols. Therefore, according to the second aspect of the present invention, the effects of the first aspect of the present invention are more reliably exhibited.

According to a third aspect of the present invention, it is preferable for the auxiliary catalyst to be a transition metal compound.

With the third aspect of the present invention, a transition metal compound is used as the auxiliary catalyst. It is thereby possible to convert the alkyl hydroperoxides generated from alkyl radicals produced by the abstraction of hydrogen atoms by way of the primary catalyst into alcohols, by more reliably reducing. Therefore, according to the third aspect of the present invention, the aforementioned effects of the first and second aspects of the present invention are more reliably exhibited.

According to a fourth aspect of the present invention, it is preferable for the auxiliary catalyst to be a compound selected from the group consisting of cobalt compounds, manganese compounds and copper compounds.

With the fourth aspect of the present invention, a compound selected from the group consisting of cobalt compounds, manganese compounds and copper compounds is used as the auxiliary catalyst. It is thereby possible to convert the alkyl hydroperoxides generated from the alkyl radicals produced by the abstraction of hydrogen atoms by way of the primary catalyst into alcohols, by even more reliably reducing. Therefore, according to the fourth aspect of the present invention, the aforementioned effects of the first and third aspects of the present invention are more reliably exhibited.

According to the fifth aspect of the present invention, it is preferable for the fuel reforming system to further include: a fuel tank (e.g., the fuel tank 12 described later) that stores fuel prior to reforming; a fuel supply means (e.g., the fuel supply part 17 described later) for supplying the fuel prior to reforming that is stored in the fuel tank into a cylinder or an intake port of an internal combustion engine (e.g., the engine described later); a gas-phase supply means (e.g., the gas-phase supply part 20 described later) for supplying the gas phase separated by the condenser into the intake port; a reformed fuel tank (e.g., the reformed fuel tank 18 described later) that stores reformed fuel in the condensed phase separated by the condenser; and a reformed fuel supply means (e.g., the reformed fuel supply part 19 described later) for supplying the reformed fuel stored in the reformed fuel tank into the cylinder or the intake port.

With the fifth aspect of the present invention, fuel prior to reforming stored in the fuel tank is supplied into the cylinders or intake ports of the internal combustion engine; whereas, the gas phase separated by the condenser is supplied into the intake ports, while the reformed fuel in the condensed phase stored in the reformed fuel tank is supplied into the cylinders or intake ports. Since alcohol of high octane rating can be supplied depending on the demand of the engine onboard the vehicle, high fuel efficiency is obtained while suppressing knocking.

Effects of the Invention

According to the present invention, it is possible to provide a fuel reforming system that can convert gasoline with hydrocarbons as the main constituent into alcohol onboard a vehicle.

BRIEF DESCRIPTION OF THE DRAWINGS

FIG. 1 is a view showing the configuration of a fuel reforming system according to an embodiment of the present invention.

PREFERRED MODE FOR CARRYING OUT THE INVENTION

An embodiment of the present invention will be explained in detail while referencing the drawing.

FIG. 1 is a view showing the configuration of a fuel reforming system 1 according to an embodiment of the present invention. The fuel reforming system 1 of the present embodiment is equipped to a vehicle that is not illustrated, and reforms hydrocarbons contained in the fuel into alcohols and supplies to the engine according to the demand of the engine that is not illustrated, onboard the vehicle. The fuel reforming system 1 of the present embodiment uses gasoline as the fuel, and uses air as an oxidizer. In other words, due to reforming gasoline using the oxidation reaction with the oxygen in air, reforming is possible under mild conditions at low temperature compared to reforming using a decomposition reaction, etc. for example; therefore, the fuel reforming system 1 of the present embodiment is a system that can simplify the system configuration and is suited to the on-demand operation onboard a vehicle.

As shown in FIG. 1, the fuel reforming system 1 according to the present embodiment is configured to include: an air introduction part 11, a fuel tank 12, a fuel introduction part 13, a mixer 14, a reformer 15, a condenser 16, a fuel supply part 17, a reformed fuel tank 18, a reformed fuel supply part 19, and a gas-phase supply part 20.

The air introduction part 11 is provided upstream of the mixer 14 describes later, and introduces air as an oxidizer into the mixer 14. The air introduction part 14 includes, in order from an upstream side of an air introduction pipe 110, an air filter 111, an air pump 112, an air flow meter 113 and an air valve 114. The air introduction part 11 draws in air from the atmosphere via the air filter 111, by driving the air pump 112. In addition, the air introduction part 11 introduces the drawn-in air into the mixer 14 by opening the air valve 114. The introduced amount of air into the mixer 14 is controlled by adjusting the aperture of the air valve 114, by way of an electronic control unit (hereinafter referred to as "ECU") that is not illustrated, based on the air flowrate detected by the air flow meter 113.

The fuel tank 12 stores gasoline principally containing hydrocarbons as the fuel. In other words, the fuel tank 12 is the fuel tank normally provided to a normal vehicle, and stores the gasoline prior to reforming.

The fuel supply part 17 includes a fuel pump 171, a fuel supply line 172 and an injector that is not illustrated. The fuel supply part 17 supplies the gasoline stored inside the fuel tank 12 into the cylinders or intake ports of the engine, which is not illustrated, via the fuel supply line 172 and injector by driving the fuel pump 171. The gasoline supply amount is configured by adjusting an injected amount of the injector by way of the ECU.

The fuel introduction part 13 is provided upstream of the mixer 14 described later, and introduces the gasoline that is the fuel into the mixer 14. The fuel introduction part 13, in order from an upstream side of the fuel introduction line 130, includes a reforming pump 131, a fuel flow meter 132 and a fuel valve 133. The fuel introduction part 13 introduces the gasoline stored inside of the fuel tank 12 into the mixer 14, by opening the fuel valve 133 along with driving the reforming pump 131. The introduced amount of gasoline into the mixer 14 is controlled by adjusting the aperture of the fuel valve 133 by way of the ECU, based on the fuel flowrate detected by the fuel flow meter 132.

The mixer 14 is provided upstream of the reformer 15 described later, and mixes air with the gasoline that is the fuel, and supplies into the reformer 15. The mixer 14 is a configuration capable of uniformly mixing the air introduced by the air introduction part 11 and the liquid gasoline introduces by the fuel introduction part 13. More specifically, for example, the mixer 14 may be configured so as to generate small air bubbles by forming small holes in a connecting part of the mixer 14 with the air introduction pipe 110. In addition, the mixer 14 may be configured so as to cause a whirlpool to form by the strong flow of air. It should be noted that the mixer 14 includes a heater that is not illustrated, and generates a mixed gas of gasoline and air by mixing the gasoline and air while heating up to a predetermined temperature.

The reformer 15 reforms the hydrocarbons that are the main component of gasoline in the mixed gas supplied from the mixer 14, using the air in the mixed gas, to produce alcohols. More specifically, the reformer 15 may be either a flow-through reactor or complete-mixing reactor.

Herein, a flow-through reactor indicates a reactor in which the mixed gas of gasoline and air introduced from the mixer 14 is reformed while being swept away like a piston and flows out, without being mixed inside the reactor with mixed gas supplied earlier or later. For this reason, a flow-through reactor has the characteristics of the composition of the fluid flowing out from the reactor and the composition of the fluid inside the reactor differing, and the variation in residence time inside the reactor of the mixed gas being small.

In contrast, complete-mixing reactor indicates a reactor in which the mixed gas of gasoline and air introduced from the mixer 14 are uniformly mixed with reactants inside the reformer and reformed. For this reason, the complete-mixing reactor has characteristics of the composition of fluid flowing out from the reactor and the composition of fluid inside the reactor being identical, and the variation in residence time inside the reactor of the mixed gas being great.

A temperature sensor that is not illustrated, and a cooling part 153 for cooling the inside of the reformer 15 are provided to the reformer 15, as shown in FIG. 1. The cooling part 153 is controlled by the ECU based on the detected temperature of the temperature sensor, and cools the reformer 15 by supplying the coolant of the engine that is not illustrated, to the reformer 15. The temperature of the engine coolant is preferably 70° C. to 100° C. If the temperature of the engine coolant is less than 70° C., the reforming reaction rate will be slow, and if exceeding 100° C., the use of engine coolant becomes difficult. It should be noted that the cooling part 153 cools the reformer 15 with engine coolant in the case of the reforming reaction progressing and the temperature of the reformer 15 being high; however, in the case of the temperature inside the reformer 15 being low at an early stage of the reforming reaction, conversely, the cooling part 153 produces a function of warming the reformer 15 with the engine coolant.

In addition, the reformer 15 includes a reforming catalyst 152 that reforms the hydrocarbons mainly contained in the gasoline using air as an oxidizer to generate alcohol. More specifically, the reformer 15 includes a cylindrical casing 151, and the catalyst 152 of solid form filled inside the casing 151.

The solid reforming catalyst 152 is configured to include a pellet-shaped porous carrier, and a primary catalyst and auxiliary catalyst loaded on the surface of the porous carrier. The primary catalyst and auxiliary catalyst are loaded on the surface of the pellet-shaped porous carrier in a state uniformly mixed. Due to the porous carrier of the reforming catalyst 152 of the present embodiment being pellet shaped in this way, the surface area of the primary catalyst and auxiliary catalyst loaded on the surface thereof increases, and the contact area with gasoline that is the fuel and air that is the oxidizer increases.

As the pellet-shaped porous carrier, for example, silica beads, alumina beads, silica-alumina beads, etc. can be used. Thereamong, silica beads are preferably used. The particle size of the porous carrier is preferably 3 μm to 500 μm.

The primary catalyst has an ability of abstracting hydrogen atoms from the hydrocarbons in gasoline to produce alkyl radicals. More specifically, as the primary catalyst, an N-hydroxyimide group-containing compound having an N-hydroxyimide group can be used. Thereamong, N-hydroxyphthalimide (hereinafter referred to as "NHPI") or an NHPI derivative is preferably used.

The auxiliary catalyst has an ability of reducing the alkyl hydroperoxides generating from the alkyl radicals to produce alcohols. More specifically, a transition metal compound can be used as the auxiliary catalyst. Thereamong, compounds selected from the group consisting of cobalt compounds, manganese compounds and copper compounds are preferably used. Cobalt(II) acetate, etc. can be used as the cobalt compound, manganese(II) acetate, etc. can be used as the manganese compound, and copper(I) chloride, etc. can be used as the copper compound.

Regarding the loading method of the above-mentioned primary catalyst and auxiliary catalyst to the porous carrier, a conventional, well-known impregnation method is adopted. For example, after preparing a slurry containing the primary catalyst and auxiliary catalyst at a predetermined mixing ratio, the pellet-shaped porous carrier is immersed in the prepared slurry. Next, the porous carrier is lifted out from the slurry, and after removing excess slurry clinging to the surface of the porous carrier, it is dried at predetermined conditions. The reforming carrier 152 in which the primary catalyst and auxiliary catalyst are uniformly loaded on the surface of a porous carrier is thereby obtained.

Herein, the reforming reaction progressing inside of the reformer 15 will be explained in detail below.

First, the reforming reaction of the present embodiment is initiated by the hydrogen abstraction reaction in which alkyl radicals are produced by hydrogen atoms being abstracted from the hydrocarbons in gasoline, as shown in reaction formula (1) below. This hydrogen abstraction reaction progresses by way of the action of the primary catalyst, radicals, oxygen molecules, etc.

[Chem. 1]

$$RH \rightarrow R. \quad \text{reaction formula (1)}$$

(In reaction formula (1), RH represents hydrocarbon, and R. represents an alkyl radical.)

Next, the alkyl radical generated by the hydrogen abstraction reaction produces an alkylperoxide radical by bonding with an oxygen molecule, as shown in reaction formula (2) below.

[Chem. 2]

$$R. + O_2 \rightarrow ROO. \quad \text{reaction formula (2)}$$

(In reaction formula (2), $O_2$ represents an oxygen molecule, and ROO. represents an alkylperoxide radical.

Next, the alkylperoxide radical generated according to reaction formula (2) produces alkyl hydroperoxide, by abstracting hydrogen atoms from the hydrocarbons contained in gasoline, as shown in reaction formula (3) below.

[Chem. 3]

$$ROO. + RH \rightarrow ROOH + R. \quad \text{reaction formula (3)}$$

(In reaction formula (3), ROOH represents alkyl hydroperoxide.

Next, the alkyl hydroperoxide generated according to reaction formula (3) is reduced to alcohol by the action of the auxiliary catalyst, as shown in reaction formula (4) below.

[Chem. 4]

ROOH→ROH                       reaction formula (4)

(In reaction formula (4), ROH represents an alcohol.)

In addition, the alkyl hydroperoxide generated according to reaction formula (3) decomposes into an alkoxy radical and hydroxyl radical by the action of the auxiliary catalyst or heat, as shown in reaction formula (5) below.

[Chem. 5]

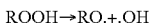

ROOH→RO.+.OH               reaction formula (5)

(In reaction formula (%), RO. represents an alkoxy radical, and .OH represents a hydroxyl radical.)

Next, the alkoxy radical generated according to reaction formula (5) produces an alcohol by abstracting a hydrogen atom from the hydrocarbon contained in gasoline.

[Chem. 6]

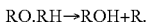

RO.RH→ROH+R.               reaction formula (6)

By configuring in the above way, hydrocarbons mainly contained in gasoline are oxidatively reformed, and converted to alcohols. In more detail, the hydrocarbons contained in gasoline are hydrocarbons having a carbon number of 4 to 10, and these hydrocarbons are converted into alcohols having a carbon number of 4 to 10. By configuring in this way, the fuel reforming system 1 of the present embodiment comes to be able to raise the octane rating of gasoline.

Next, the condenser 16 is provided downstream of the reformer 15, and separates the product gas generated by the reformer 15 into a condensed phase with reformed fuel as a main constituent, and a gas phase. The condenser 16 has a heat exchanger (not illustrated) inside thereof, and separates the product gas discharged from the outlet of the reformer 15 into the gas phase and condensed phase with reformed fuel as the main constituent by cooling. It should be noted that, in addition to the reformed fuel with alcohol as the main component, water, etc. as byproducts are contained in the condensed phase, and nitrogen, oxygen, other gas components of byproducts are contained in the gas phase.

The reformed fuel tank 18 stores reformed fuel in the condensed phase separated by the condenser 16. The reformed fuel tank 18 functions as a buffer tank temporarily storing the alcohol that is the reformed fuel produced by reforming gasoline by way of the reformer 15.

The reformed fuel supply part 19 supplies the reformed fuel stored in the reformed fuel tank 18 into the cylinders or intake ports of the engine. The reformed fuel supply part 19 includes a reformed fuel pump 191, a reformed fuel supply line 192, and an injector that is not illustrated. The reformed fuel supply part 19 supplies the reformed fuel stored inside the reformed fuel tank 17 into the intake ports of the engine (not illustrated), via the reformed fuel supply line 192 and injector by driving the reformed fuel pump 191. The alcohol supply amount is controlled by adjusting the injection amount of the injector by way of the ECU.

The gas supply part 20 supplies the gas phase separated by the condenser 16 into the intake ports of the engine. The gas-phase supply part 20 includes the gas-phase supply line 201 connected to the intake ports of the engine. The gas phase separated by the condenser 16 is supplied into the intake ports of the engine via the gas-phase supply line 201.

The fuel reforming system 1 of the present embodiment including the above configuration is controlled by the ECU to operate as follows.

First, in the case of being judged that reforming of gasoline is necessary depending on the operating state of the engine, it is determined whether the temperature of the engine coolant is at least a predetermined temperature. When the temperature of the engine coolant immediately after engine start is less than the predetermined temperature, the reformed fuel stored inside the reformed fuel tank 18 during previous reforming is supplied into the intake ports of the engine by way of the reformed fuel pump 191.

In contrast, when the temperature of the engine coolant is at least the predetermined temperature, the fuel valve 133 and air valve 114 are opened. Next, gasoline is pressure fed from the fuel tank 12 by the reforming pump 131, and introduced into the mixer 14. At the same time, air passing through the air filter 111 is introduced into the mixer 14 by the air pump 112.

At this time, the apertures of the fuel valve 133 and air valve 113 are feedback controlled based on the gasoline flowrate monitored by the fuel flow meter 132 and the air flowrate monitored by the air flow meter 113, so as to be the desired appropriate proportion of gasoline flowrate/air flowrate, and so that the desired appropriate reforming reaction time is obtained. The gasoline flowrate and air flowrate are thereby controlled.

Next, after making the gasoline and air introduced into the mixer 14 into the mixed gas by uniformly mixing while warming to a predetermined temperature, it is supplied into the reformer 15. The hydrocarbons that are the main component of gasoline in the mixed gas supplied into the reformer 15 are converted to alcohols by the aforementioned reaction formulas (1) to (6) progressing by the action of the reforming catalyst 152. At this time, the supply of engine coolant is controlled based on the temperature monitored by the temperature sensor. The temperature inside the reformer 15 is thereby maintained at the desired appropriate temperature.

Next, the product gas generated by the reformer 15 is separated into the condensed phase and gas phase by cooling with the heat exchanger inside the condenser 16. The alcohol of the reformed fuel is contained mainly in the condensed phase thus separated, and the reformed fuel is introduced into the reformed fuel tank 18 to be stored. The reformed fuel inside the reformed fuel tank 18 is supplied into the intake ports of the engine by way of the reformed fuel pump 191. On the other hand, the gas phase thus separated is offered for combustion inside the cylinders of the engine, by introducing to the intake ports of the engine.

In the case of being judged that reforming of fuel is unnecessary depending on the operating state of the engine, first, the air pump 112 is stopped and the air valve is closed to stop the supply of air into the mixer 14. Next, after the inside of the reformer 15 is filled with gasoline and air has completely discharged, the reforming pump 131 is stopped and the fuel valve 133 is closed to stop the supply of gasoline into the mixer 14. A situation in which the reforming reaction progresses with the oxygen remaining inside the reformer 15 is thereby avoided during system stop.

The following effects are exerted according to the present embodiment.

(1) The fuel reforming system of the present embodiment is provided with, in order from an upstream side, the mixer 14 that mixes gasoline with hydrocarbons as a main constituent and air and supplies to the reformer 15, the reformer 15 that reforms gasoline using the air to produce alcohols, and the condenser 16 that separates the product gas generated by the reformer 15 into the condensed phase and gas phase. In addition, the reformer 15 is provided with the reforming catalyst 152 that is configured to include the primary catalyst which abstracts hydrogen atoms from the hydrocarbons in the gasoline to produce alkyl radicals, and the auxiliary catalyst which reduces alkyl hydroperoxides produced from the alkyl radicals to produce alcohols.

According to the present embodiment, since hydrocarbons in gasoline can be converted to alcohols by reforming, the octane rating can be raised. In addition, equipping to a vehicle is possible due to the configuration of the system being simple by using air as the oxidizer, whereby fuel of high octane rating can be supplied to the engine according to the demand of the engine onboard the vehicle. Therefore, according to the present embodiment, even with engines of raised compression ratio, high fuel efficiency is obtained while suppressing knocking.

(2) In addition, in the present embodiment, an N-hydroxyimide group-containing compound is used as the primary catalyst. Since hydrogen atoms can thereby be more reliably abstracted from the hydrocarbons in the gasoline, it is possible to cause the hydrocarbons to convert to alcohols more reliably. Therefore, the aforementioned effect (1) of the invention is more reliably exhibited.

(3) Furthermore, in the present embodiment, a transition metal compound is used as the auxiliary catalyst. It is thereby possible to convert the alkyl hydroperoxides generated from alkyl radicals produced by abstracting hydrogen atoms by way of the primary catalyst into alcohols, by more reliably reducing. Therefore, the aforementioned effects (1) and (2) of the invention are more reliably exhibited.

(4) In addition, in the present embodiment, a compound selected from the group consisting of cobalt compounds, manganese compounds and copper compounds is used as the auxiliary catalyst. It is thereby possible to convert the alkyl hydroperoxides generated from the alkyl radicals produced by abstraction of hydrogen atoms by way of the primary catalyst into alcohols, by even more reliably reducing. Therefore, the aforementioned effects (1) and (2) of the invention are even more reliably exhibited.

(5) In addition, in the present embodiment, gasoline prior to reforming stored in the fuel tank 12 is supplied into the cylinders or intake ports of the engine; whereas, the gas phase separated by the condenser 16 is supplied into the intake ports, while the alcohol that is the reformed fuel stored in the reformed fuel tank 18 is supplied into the cylinders or intake ports. Since alcohol of high octane rating can be supplied depending on the demand of the engine onboard the vehicle, high fuel efficiency is obtained while suppressing knocking.

It should be noted that the present invention is not to be limited to the above-mentioned embodiment, and that modifications, improvements, etc. within a scope that can achieve the objects of the present invention are encompassed by the present invention.

In the above-mentioned embodiment, although gasoline is used as the fuel, it is not limited thereto. For example, even in the case of using alcohol-containing gasoline which contains alcohols such as ethanol, the same effects as the above-mentioned embodiment will be exerted.

EXPLANATION OF REFERENCE NUMERALS

1 fuel reforming system
12 fuel tank
14 mixer
15 reformer
16 condenser
17 fuel supply part (fuel supply means)
18 reformed fuel tank
19 reformed fuel supply part (reformed fuel supply means)
20 gas-phase supply part (gas-phase supply means)
152 reforming catalyst

The invention claimed is:

1. A fuel reforming system comprising:
   a reformer that includes a reforming catalyst which reforms hydrocarbons in fuel consisting of gasoline or gasoline that contains alcohol using air to produce alcohols;
   a mixer that is provided upstream of the reformer, and mixes the fuel and air and supplies to the reformer; and
   a condenser that is provided downstream of the reformer, and separates product gas generated by the reformer into a condensed phase with reformed fuel as a main constituent and a gas phase,
   wherein the reforming catalyst is configured to include a primary catalyst which abstracts hydrogen atoms from hydrocarbons in the fuel to produce alkyl radicals, and an auxiliary catalyst which reduces alkyl hydroperoxides generated from the alkyl radicals and oxygen to produce alcohols,
   wherein the reformed fuel has a higher octane rating than the fuel, and
   wherein the reformer comprises a cooling part configured to cool the reformer with coolant supplied from the internal combustion engine to the reformer.

2. The fuel reforming system according to claim 1, wherein the primary catalyst is an N-hydroxyimide group-containing compound.

3. The fuel reforming system according to claim 1, wherein the auxiliary catalyst is a transition metal compound.

4. The fuel reforming system according to claim 1, wherein the auxiliary catalyst is a compound selected from the group consisting of cobalt compounds, manganese compounds and copper compounds.

5. The fuel reforming system according to claim 1, further comprising:
   a fuel tank that stores fuel prior to reforming;
   a fuel supply means for supplying the fuel prior to reforming that is stored in the fuel tank into a cylinder or an intake port of an internal combustion engine;
   a gas-phase supply means for supplying the gas phase separated by the condenser into the intake port;
   a reformed fuel tank that stores reformed fuel in the condensed phase separated by the condenser; and
   a reformed fuel supply means for supplying the reformed fuel stored in the reformed fuel tank into the cylinder or the intake port.

6. The fuel reforming system according to claim 1,
   wherein the mixer includes a heater, and
   wherein the mixer produces a mixture of the fuel and air by mixing the fuel and air while heating to a predetermined temperature.

7. The fuel reforming system according to claim 5, further comprising:
   a reforming pump and fuel valve on an upstream side of the mixer that introduce the fuel into the mixer;
   an air pump and air valve on an upstream side of the mixer that introduce the air into the mixer; and a control unit that opens the fuel valve and the air valve when a coolant temperature of the internal combustion engine is at least a predetermined temperature.

8. The fuel reforming system according to claim 7, further comprising:
a fuel flow meter on an upstream side of the fuel valve; and
an air flow meter on an upstream side of the air valve,
wherein the control unit performs feedback control for apertures of the fuel valve and the air valve such that the fuel and air introduced into the mixer form an appropriate ratio of fuel flow rate/air flow rate, based on a the fuel flow rate monitored by the fuel flow meter and the air flow rate monitored by the air flow meter.

9. The fuel reforming system according to claim 7, wherein the control unit, in a case of determining that reforming of the fuel is unnecessary according to an operating state of the internal combustion engine, stops supply of air into the mixer by stopping the air pump and closing the air valve, and after inside of the reformer is filled with fuel, stops supply of gasoline into the mixer by stopping the reforming pump and closing the fuel valve.

* * * * *